(12) United States Patent
De Larminat

(10) Patent No.: US 8,092,158 B2
(45) Date of Patent: Jan. 10, 2012

(54) METHOD OF POSITIONING SEALS IN TURBOMACHINERY UTILIZING ELECTROMAGNETIC BEARINGS

(75) Inventor: Paul Marie De Larminat, Nantes (FR)

(73) Assignee: Johnson Controls Technology Company, Holland, MI (US)

( * ) Notice: Subject to any disclaimer, the term of this patent is extended or adjusted under 35 U.S.C. 154(b) by 821 days.

(21) Appl. No.: 12/189,471

(22) Filed: Aug. 11, 2008

(65) Prior Publication Data

US 2009/0045582 A1   Feb. 19, 2009

Related U.S. Application Data

(60) Provisional application No. 60/956,229, filed on Aug. 16, 2007.

(51) Int. Cl.
*F01D 17/12* (2006.01)

(52) U.S. Cl. ............ 415/163; 413/65; 413/68; 413/104; 384/106; 384/107; 384/118

(58) Field of Classification Search .................... 415/65, 415/68, 104, 163; 384/106–107, 118, 278; 310/90.5
See application file for complete search history.

(56) References Cited

U.S. PATENT DOCUMENTS

| 5,238,308 A | 8/1993 | Lang et al. | |
|---|---|---|---|
| 2008/0219834 A1* | 9/2008 | Merfeld et al. | 415/163 |

FOREIGN PATENT DOCUMENTS

| DE | 195 26 291 A1 | 1/1996 |
|---|---|---|
| DE | 195 48 664 A1 | 6/1997 |
| EP | 1 310 690 A | 5/2003 |

OTHER PUBLICATIONS

International Search Report/Written Opinion of the International Searching Authority for PCT/US2008/073272, mailing date May 8, 2009.

* cited by examiner

*Primary Examiner* — Dung A. Le
(74) *Attorney, Agent, or Firm* — McNees Wallace & Nurick LLC

(57) ABSTRACT

A method of positioning a shaft and associated seal in turbomachinery utilizing electromagnetic bearings. The method includes applying electrical power to the electromagnetic bearings' windings, the shaft center being in a first position and the shaft being in contact with the associated seal. Power adjustment to the electromagnetic bearings moves the shaft. Shaft movements can manipulate the seal, the movements being of decreasing amplitude to a position in which the seal is out of contact with the shaft when the shaft is rotated at its centered position during normal operation. The shaft is in its centered position during normal operation when the shaft axis is substantially coaxial with an axis of the electromagnetic bearings. Movements of decreasing amplitude may include oscillations of decreasing amplitude about one or more axes, or may include a spiral rotation with a decreasing radius to move the shaft center from initial to final positions.

13 Claims, 5 Drawing Sheets

METHOD OF POSITIONING SEALS IN TURBOMACHINERY UTILIZING ELECTROMAGNETIC BEARINGS

BACKGROUND

The process and apparatus set forth herein generally relates to turbomachinery such as compressors or turbines having bearings utilizing active magnetic technology and more specifically to improving the sealing arrangement of the turbomachinery shaft.

Active magnetic technology in the form of electromagnetic bearings is currently utilized in some turbomachinery to levitate rotors and shafts, instead of conventional technologies like rolling element bearings or fluid film bearings. The position of the rotor is monitored by position sensors. Usually there are at least 4 position sensors equally spaced around the bore of the magnetic bearings. These sensors feed the information to a controller, which in turn adjusts the electrical current supplied to the electromagnetic bearings to maintain the center of the shaft at a desired position or within a desired tolerance range. The bearing electronics normally seeks to keep the shaft at equal distance from all the sensors. In this position, the shaft axis and the electromagnetic bearings axis are substantially coaxial. Substantially coaxial means that the shaft can deviate from the axis of the electromagnetic bearings by an allowable tolerance that does not affect the operation of the turbomachinery but which can vary depending upon the design of the turbomachinery, and upon various deviations from an ideal situation, such as unbalance, run-out or unsteady aerodynamic forces. As used herein, the normal operating position of the shaft is also referred to as the centered position, meaning that the shaft axis coincides with (or lies within an acceptable tolerance of) the bearing axis. As turbomachinery normally includes at least two sets of radial bearings, here electromagnetic bearings, the descriptions set forth herein apply to each of the sets of bearings.

In the event of a loss of power to the bearing electronics during rotation, or of a failure of the control electronics, the magnetic bearings are disabled, and the shaft can no longer be supported by the electromagnetic bearings. The shaft would then be supported by the mechanical components of the electromagnetic bearings supplied for this purpose and/or supported by seals. These elements and the shaft are not designed for permanent mechanical contact, particularly when the turbomachinery is rotating. Therefore, mechanical bearings are provided as a back-up or safety feature to support the shaft when the magnetic bearings are disabled. The mechanical bearings are fixed with respect to the electromagnetic bearing, and both concentric and coaxial with them as permitted by manufacturing tolerances. Therefore, as used herein, this common center of the electromagnetic and mechanical bearings is referred to as the center of the bearings meaning that the electromagnetic and mechanical bearings are both concentric and coaxial. When the magnetic bearings are disabled, the shaft comes to rest under the effect of gravity and other static forces that may be present. When the axis is oriented horizontally in the turbomachinery, the rest position will normally be the lowest position within the allowable clearance of the mechanical bearings. When the axis is vertical, the rest position is not predictable. While the clearance between parts such as shafts and bearings will vary dependent on equipment size, a radial clearance between a shaft and electromagnetic bearing for a typical centrifugal compressor is of the order of about 1 mm (0.040 inches). During normal or powered operation of the turbomachinery, the rotating machinery must operate without contacting the mechanical bearings to avoid wear of both the shaft and the bearings, while the mechanical bearings remain stationary. Thus, there must be some clearance between the shaft and the mechanical back-up bearings when the shaft is magnetically levitated. The radial clearance between the shaft and the mechanical bearings usually is about 0.25 mm (0.010 inches). When the electromagnetic bearings are disabled, the mechanical bearings support the shaft while the turbomachinery is stopped or coasting to a stop, without any contact between the shaft and the electromagnetic bearings. While any one of a variety of bearings may be used as the back-up or safety bearings, rolling element type bearings are often preferred.

In turbomachinery, the shaft is also generally associated with gas seals to reduce or prevent any leakage along the shaft. For centrifugal compressors, gas leakage is also reduced or prevented at the inlet of the impellers for units utilizing shrouded impellers. The use of mechanical bearings as back-up bearings affects the design and mechanical arrangement of the seals used to reduce gas leakage in turbomachinery. The most straightforward design for seals is to have a cylindrical sleeve facing the shaft with low clearance. An alternative design used to reduce the leakage flow along the shaft is a seal having a labyrinth geometry, also referred to as a labyrinth seal. Rather than trying to seal with a single long barrier, a labyrinth seal uses multiple throttling steps to accomplish a reduction in leakage flow.

Gas seals are usually made of two hard surfaces with carefully matched diameters and geometries such that they do not contact adjutant surfaces in normal operation. Not only is mechanical friction between shaft and seal reduced or eliminated, but more importantly so is seal and shaft wear. As noted above, the simplest and best way to reduce gas leakage is to minimize the clearance between the seal and the shaft while simultaneously avoiding contact. A typical desired radial clearance for gas seals is 0.1 to 0.15 mm (0.004-0.006 inches) between the shaft and the seal, which is less than the typical radial clearance of the back-up mechanical bearings, typically 0.25 mm (0.010 inches). Having a clearance of the mechanical bearings greater than the desired clearance of the seals complicates the design of such seals. The design of the seals must consider the effect of the mechanical bearings. If the seals are rigidly fixed to the housing adjacent the shaft, the seal clearance should be at least equal to the clearance between the shaft and the mechanical bearings to avoid contact between the seal and the shaft when the magnetic bearings are disabled and the mechanical bearings are relied upon to provide the support for the shaft. Failure to provide this clearance could result in wear of the seal, which can result in loss of efficiency of the machine. In more severe cases, damage to the shaft can occur and overheating of the contacting parts, the shaft and the seal, can occur due to high temperatures resulting from friction. In addition, because of the difficulty associated with properly aligning the seals with the shaft, the assembly of fixed seals adjacent the shaft is difficult and time consuming.

One way to reduce the clearance between the shaft and seal is to mount the seal so that it is not rigidly mounted to the housing. Rather, the seal is movably mounted in such a way that it can slide radially so as to follow the motion of the shaft with limited resistance when the shaft position interferes with the seal. The use of springs to urge seal movement and substantially self-center the seal with respect to the shaft is well known. In such designs, when the power to the electromagnetic bearings is turned on and off, the seal follows the movement of the shaft inasmuch as the shaft interferes with the seal position; but the shaft and seal are not necessarily concentric, and may remain in contact. For instance, for a horizontally-oriented shaft, when power is removed from the electromagnetic bearings, the shaft drops onto the bearings as a result of gravity, until it contacts the back-up mechanical bearings. The seals are then biased downward against the shaft in its rest position, but the seals and the shaft are then in mutual contact and not concentric. Some wear will occur between the shaft and seals if the shaft is rotating in this position, such as when the shaft is coasting to a stop during power down. When power is restored to the electromagnetic bearings, the shaft is levitated back to its normal operating position and pushes the seals upward, the seals being in residual contact with the shaft. The seals still being in contact with the shaft, wear will occur when the machine is rotated in this position.

Although the contact forces are small when the electromagnetic bearings are re-levitated on restoration of power, there is still friction between the shaft and seal on reinstitution of rotation of the turbomachinery. The design of the seal must accommodate this friction. The materials must be selected to withstand this friction without excessive wear and heating, which makes the design more complicated and expensive. Despite these design efforts, the seal will eventually exhibit some amount of wear and performance deterioration. Periodic maintenance may be required to restore the operating characteristics of the turbomachinery, which may require seal replacement and/or shaft repair or replacement, unless additional wearing sleeves are provided in the design to protect the shaft, in which case replacement of these sleeves may be required during maintenance.

What is needed is a system that allows minimal clearance between the seal and shaft without the need for costly and intricately designed seals. A minimal clearance should be maintained during assembly and operation of the machine. The present invention provides methods that satisfy one or more of these needs and provides other advantageous features.

SUMMARY

One embodiment relates to centering a shaft seal with respect to the shaft, in turbomachinery that utilizes electromagnetic bearings, prior to start up of the turbomachinery. As used herein, the term "electromagnetic bearings" includes those bearings that combine active electromagnetic operation with the passive effect of permanent magnets to compensate for permanent static loads, such as weight as well as "electromagnetic bearings" without permanent magnets that operate only with application of electric current. Usually, the clearance of the gas seal is less than that of the back-up bearings, which is desired for efficient operation of the turbomachinery. By substantially centering the shaft with respect to the seal, the shaft and the seal are substantially concentric. As used herein, the term concentric means the geometric center of the shaft and of the seal are substantially the same. Inasmuch as the shaft has an axial length and the seal, particularly a labyrinth seal, also has an axial length, the geometric axis of the seal and the axis of the shaft may also be substantially coaxial, which is encompassed within the term concentric, as used herein.

Set forth herein is a method of positioning a seal movable in a radial direction in turbomachinery utilizing electromagnetic bearings controlled by a controller. The method comprises the steps of applying power to the electromagnetic bearings with a controller. The controller controls the motion of the shaft by application of power to windings of the electromagnetic bearings in a programmed sequence. The shaft is moved into contact with the seal by application of power to the bearings by the controller, which moves the shaft in a radial direction, thereby moving the seal to a radial position. This radial position is selected to avoid contact between the shaft and seal when the shaft is in its centered position and rotating.

The method may include an additional step, after the seal is placed at the desired location by the shaft, in which the shaft is moved back out of contact with the seal and centered so that the shaft axis is substantially coaxial with the axis of the electromagnetic bearings prior to initiating rotation of the shaft.

Logic, alternatively described as programming, within the controller controls the power applied to the electromagnetic bearings so as to move the center of the shaft in a predetermined trajectory. The trajectory is designed so that, when followed, the shaft contacts the seal, thereby moving the seal to a desired location.

Achieving a perfect centering of the seal with respect to the center of the bearings provides substantial benefits by minimizing the risk of contact and wear between the shaft and seal in normal operation. But it also introduces potential drawbacks. In case of a power failure or failure of the bearing electronics, the shaft will reach its rest position while the machine is still coasting down, which will generate some wear. The overall or ideal result is to minimize the overall risk of contact in normal operation, as well as in such abnormal situations. Instead of seeking a perfect centering of the seal with respect to the bearings, a trade-off may be made resulting in positioning the seal center somewhere between the perfect centering and the center of the shaft in its rest position. For instance, for a horizontally mounted machine, the center of the seal must be moved upward from its position at rest. Yet the choice may be not to move it all the way to the center of the bearings, but to an intermediate position between the rest position and the center of the bearings, providing the seal is moved sufficiently to avoid contact between the shaft and seal in normal operation. Reducing the seal displacement to this minimum value will reduce the risk of wear in abnormal situations. The various procedures described below are intended to place the center of the seal at a desired position, which is implicitly assumed to be coincident with the center of the bearings. If a position different than the center of the bearings is chosen to be the center of the seal, then the same procedures will apply; only the target position is changed.

For purposes of illustration only, the shaft may be mounted horizontally, but is not so limited. In a horizontal orientation, after power is removed from the electromagnetic bearings, the shaft of the turbomachinery is drawn downward by force of gravity. The center of the shaft shifts from a first normal running position where it coincides with the center of the bearings, to a second rest position in which the shaft contacts the back-up bearings, provided as a safety feature. As it is being drawn downward to the rest position, the shaft first contacts the seal, that is also moved downward, moving the center of the seal with respect to the center of the bearings, until the shaft and seal come to rest when the shaft comes in contact with the back-up mechanical bearings. Both the shaft and the seal are now in the second, lower, rest position. Prior to re-starting the machine, electrical power is applied to the windings of the electromagnetic bearings to move the shaft center along a first preselected radial axis. Usually this axis extends through the center of the shaft when it is at rest, to the shaft center in its normal, centered position. For a horizontally-oriented shaft, this radial axis usually extends vertically, and the initial motion is upward along the vertical axis to the centered position, and then beyond the centered position, that is to say, overshooting the centered position, to a third position located about one half the diametral clearance between the shaft and the mechanical safety bearings above the centered position, without contacting the mechanical safety bearings. This motion results in the shaft contacting the seal and moving it to a new position. Power is then applied to the electromagnetic bearings to move the shaft back to its centered position. This aligns the first preselected axis, as noted, the vertical axis of the shaft with respect to the seal.

The above method assumes that seal clearance is known. Actually, seal clearance is not known precisely due to a number of factors, including manufacturing tolerances and wear which may have occurred. To overcome this uncertainty, positioning of the seal can be further improved. Instead of overshooting by the clearance along the first preselected axis, the overshoot should initially be by a distance larger than the theoretical seal clearance, but smaller than the mechanical bearing clearance. The shaft can then be moved back and forth along this axis in an oscillating or reciprocating motion of decaying amplitude about the geometric center of the electromagnetic bearings. In this way, the shaft will move the seal back and forth while the amplitude of the motion is larger than the seal clearance. Continued oscillation or reciprocation of the shaft across the geometric center with smaller and smaller amplitudes will eventually result in motions that are less than the seal clearance, and the shaft will not touch the seal during these motions. As a result, the seal will be perfectly centered about the first preselected axis.

In another embodiment, the method of centering a shaft and an associated seal moveable in a radial direction in turbomachinery utilizing electromagnetic bearings comprises applying electrical power to windings of the electromagnetic bearings in which a shaft center is located on a shaft axis in a first position and wherein the shaft is in contact with the associated seal, and wherein a radius can be defined between the shaft center and an axis of the electromagnetic bearings. Electrical power to the windings of the electromagnetic bearings is adjusted to move the shaft and its center in a spiral having a constantly decreasing radius, the initial radius being defined by a perpendicular line extending from the axis of the electromagnetic bearings to the shaft center, and the final radius approaching zero when the shaft axis substantially is coaxial with the axis of the bearings, thereby placing the shaft center along (or within permitted tolerance) of the axis of the bearings. The electrical power to the windings of the electromagnetic bearings is adjusted until the constantly decreasing radius approaches zero. Position sensors then measure the position of the shaft and compare it to the position of the electromagnetic bearings, which are fixed, to determine and verify that the shaft axis in the normal operating configuration and electromagnetic bearings axis are substantially coaxial. If the measurements determine that coaxiality is not within required tolerances or that the shaft center does not lie on the axis of the electromagnetic bearings in their normal operating configuration, within required tolerances, then these steps can be repeated as necessary until the shaft axis and electromagnetic bearings axis are substantially coaxial.

In yet another embodiment, the method of centering the shaft and positioning the associated seal in turbomachinery utilizing electromagnetic bearings comprises providing seals that can be moved in a radial direction. Power is applied to electromagnetic bearings to move the shaft and the seal into contact with each other from an initial position in which the shaft is at rest and the seal is at rest. Power is provided to the electromagnetic bearings to position the shaft and the seal radially so that the seal is located at a second position that provides clearance between the shaft and the electromagnetic bearings. The clearance region is a radial space between the shaft radius and the radius of the bearings in which the shaft and seal will not contact when the shaft is centered within the bearings. By further manipulating power to the electromagnetic bearings, the shaft axis may be positioned substantially coaxially with the axis of the electromagnetic bearings so that the shaft is centered on the axis of the electromagnetic bearings and out of contact with the seal. Once the seal position has been manipulated by the shaft, when the shaft is rotated during normal operation at its centered position, there is minimal, and ideally no contact between the rotating shaft and the seal positioned at the second position. Minimal clearance may occur when the rotating shaft just contacts the seal, but with no appreciable wear that would adversely affect seal clearance. While the condition of minimal clearance is not preferred, it is recognized that it may occur, and is included as an acceptable condition and within the scope of this disclosure. When the shaft axis is substantially coaxial with the axis of the electromagnetic bearings and the seal is located at its second position, a radial clearance exists 360 degrees around the circumference of the shaft between the shaft and the seal.

At this step in the procedure, the seal is now substantially perfectly centered about the first predetermined radial axis, but not necessarily about the geometric center of the bearings. To achieve the centering of the seal about the geometric center, a second radial axis perpendicular to the first axis is selected, while maintaining the shaft centered along the first axis. The steps of decaying, oscillating or reciprocating motion as described above are now repeated along the second axis. Alternatively, the shaft center may be moved with a decreasing distance from the axis of the electromagnetic bearings, so that the movement of the shaft center is a decaying spiral that results in the shaft center being positioned on the radial axis of the electromagnetic bearings, and the shaft longitudinal axis is coaxial with the longitudinal axis of the electromagnetic bearings. The oscillating or reciprocating motion of the shaft in decreasing amplitudes is readily controlled by a properly programmed controller that controls application of power to the windings of the electromagnetic bearings.

When the shaft is moved as described above prior to restart of the turbomachinery, the shaft and seal can be positioned substantially concentric with the bearings and the turbomachinery can restart rotation in normal operation with a small gap between the shaft and the seal, so there is no seal contact with the shaft. By returning the seal and the shaft to a position in which they are substantially concentric, the problem with residual contact between the shaft and bearing and the wear associated with it is eliminated. By repeating the process with decaying amplitude, any variations of the shaft with respect to the seal, either due to variations in manufacturing tolerances, eccentric motion of the shaft during coast-down following loss of power, can be corrected. Furthermore, the preselected radial axes are not limited to simply a first and a second preselected radial axis perpendicular to one another. The decaying spiral can be approximated as closely as desired by proper programming of a controller that controls the electromagnetic bearings.

The process for positioning can be incorporated into existing turbomachinery without adding additional equipment. The process reduces the wear resulting from residual contact between the seal and the shaft, resulting in a longer life for the seal, while eliminating a source of damage for the shaft. Furthermore, a smaller gap can be maintained between the seal and the shaft than in turbomachinery with rigidly mounted seals. The radial clearance between the seal and the shaft can be reduced and maintained for a longer time, since less contact will occur between the seal and the shaft.

Alternative exemplary embodiments relate to other features and combinations of features as may be generally recited in the claims.

DETAILED DESCRIPTION OF THE EXEMPLARY EMBODIMENTS

Figure 1:
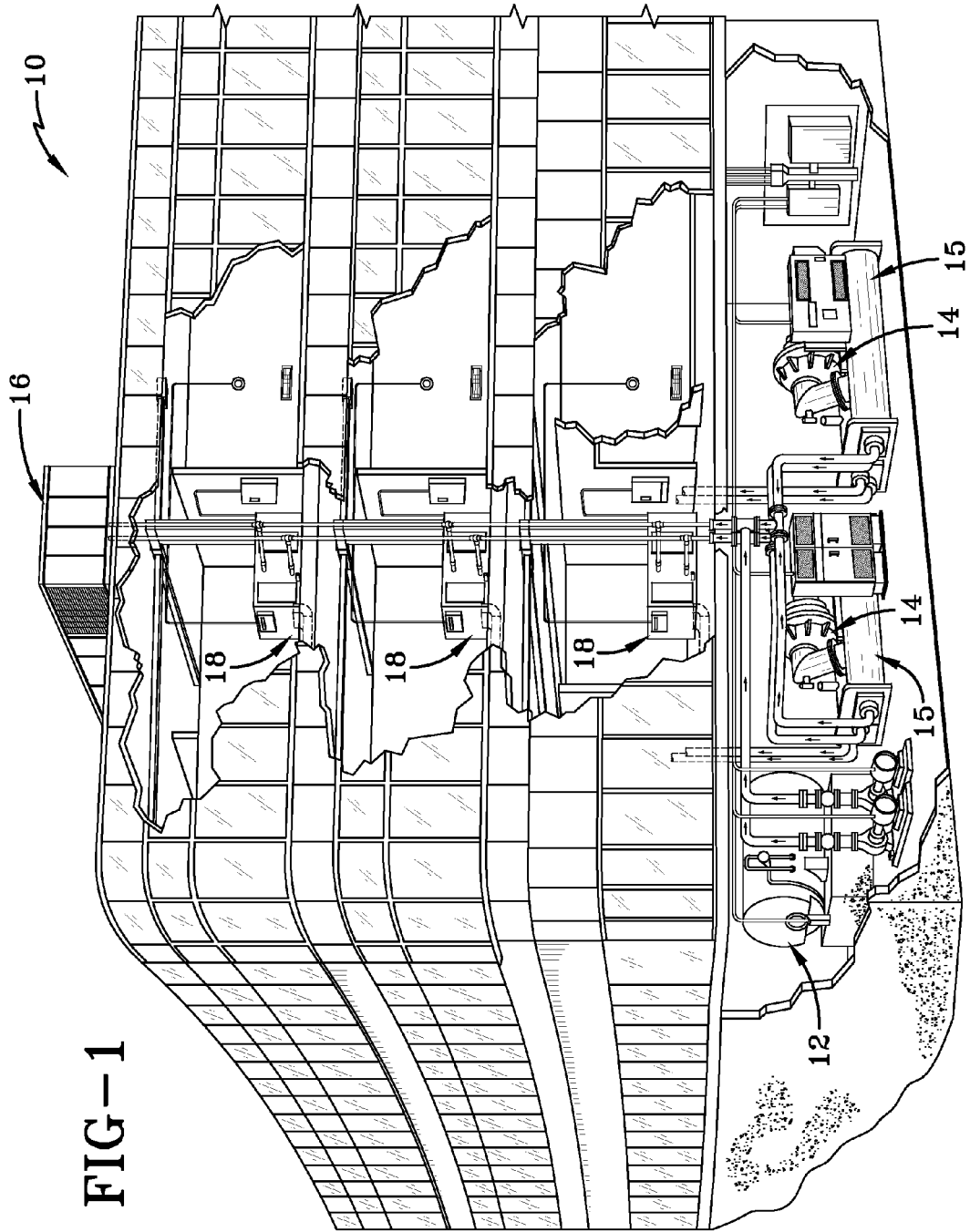
FIG. 1 depicts a building having a heating and cooling system that includes turbomachinery, a centrifugal compressor, located in the basement and a rooftop cooling tower.

FIG. 1 depicts a building 10 equipped with a typical heating and cooling system. The heating and cooling system includes a boiler 12 and a centrifugal compressor 14 in the basement along with an evaporator and a condenser 15. Centrifugal compressor 14 is equipped with electromagnetic bearings. The condenser 15 is in fluid communication with a cooling tower 16, shown as located on the rooftop, but whose location is not so limited. Each floor of building 10 is equipped with an air handling system 18 to distribute air to each floor of the building.

Figure 2:
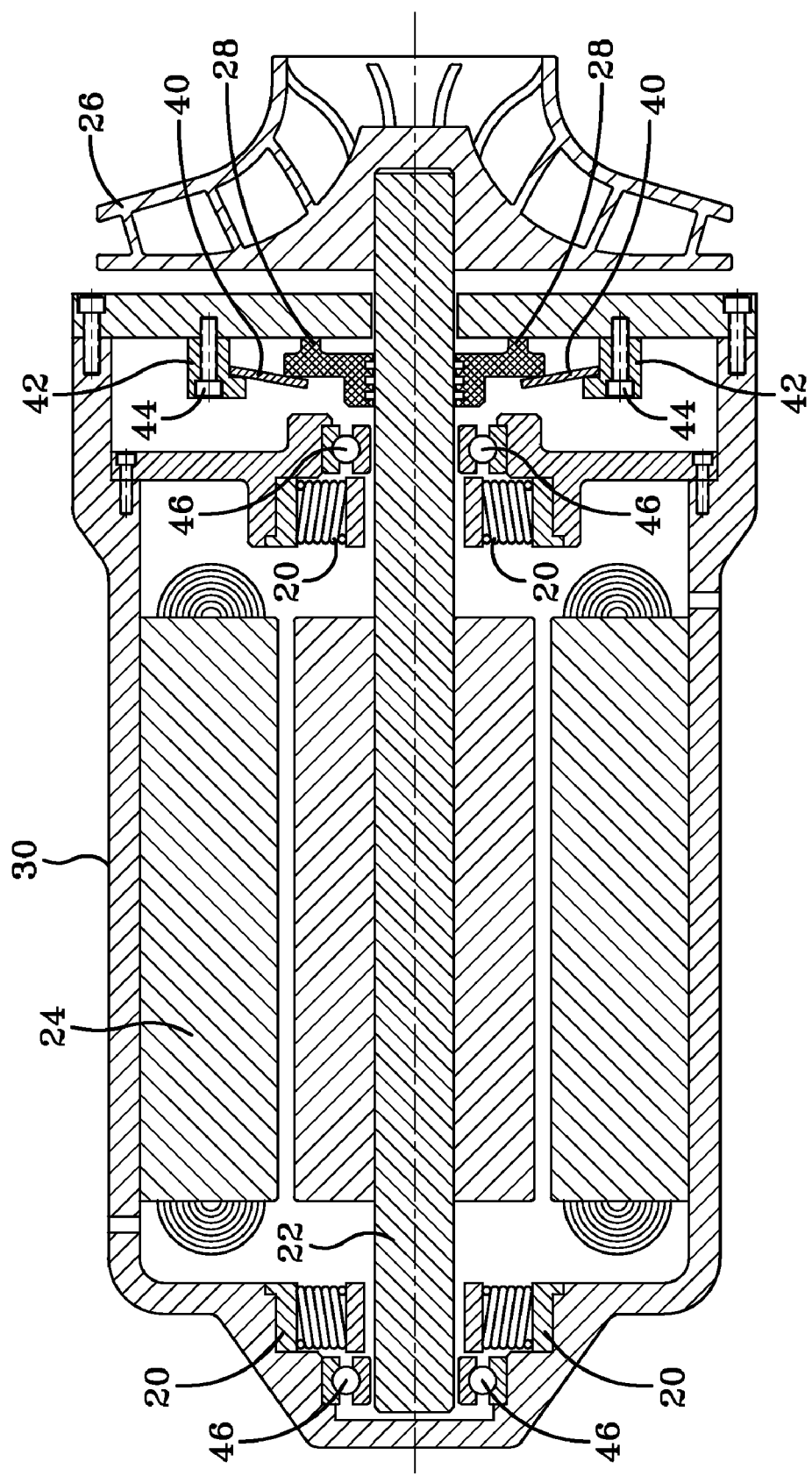
FIG. 2 is a cross-sectional view of a centrifugal compressor of FIG. 1 that utilizes electromagnetic bearings.

FIG. 2 is a cross-sectional view of centrifugal compressor 14 of FIG. 1. Centrifugal compressor 14 is similar to other prior art centrifugal compressors, except that it is equipped with electromagnetic bearings 20 surrounding either end of a shaft 22. When powered, electromagnetic bearings 20 suspend shaft 22 within both bearings 20 and a motor 24 so that shaft 22 can rotate impeller 26 with minimal frictional losses. A gas seal 28 is provided between shaft 22 and housing 30 to prevent leakage of fluid across the gap between shaft 22 and housing 30.

Figure 3:
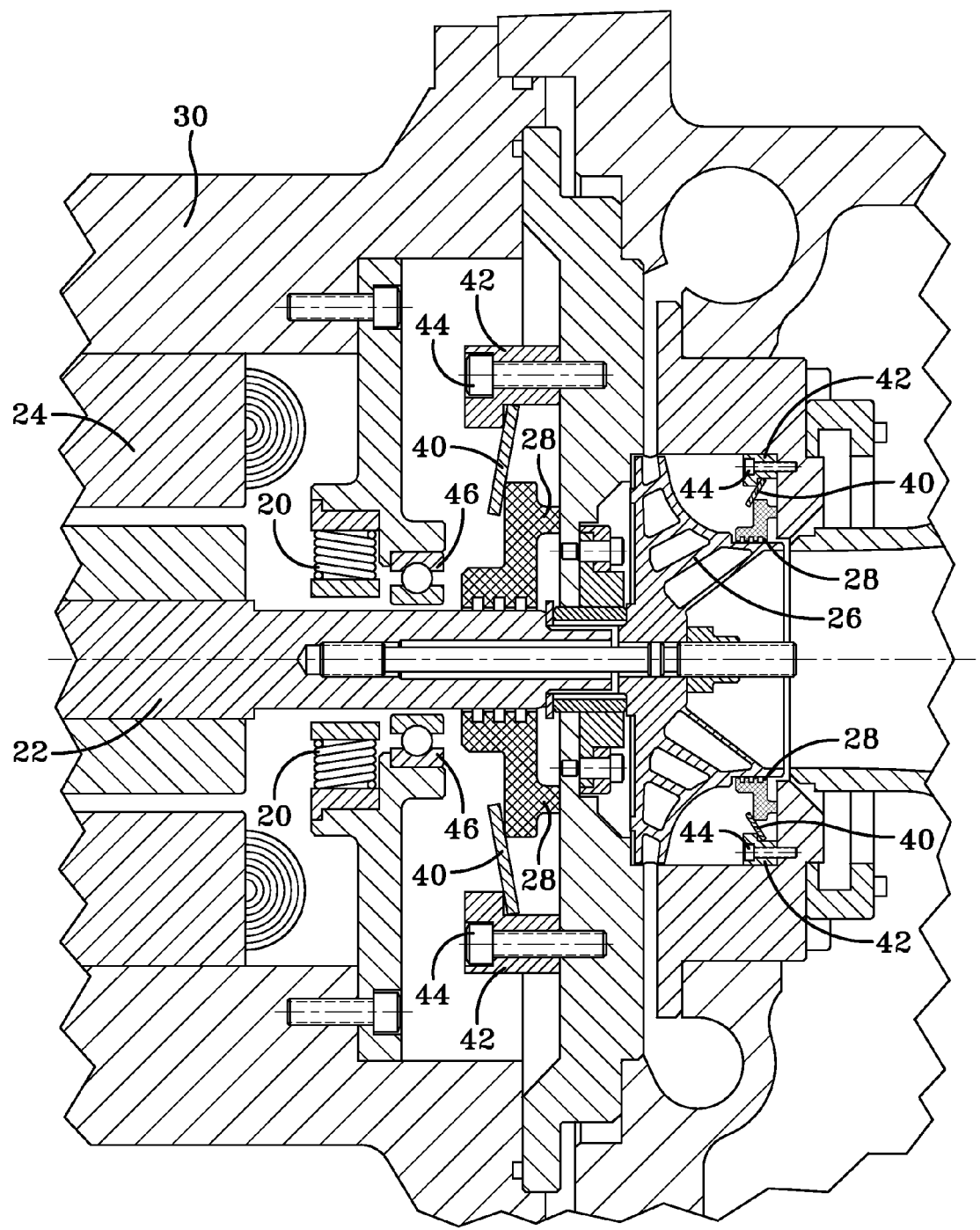
FIG. 3 is a detailed view of a centrifugal compressor of the present invention showing the labyrinth seals centered around the shaft.

FIG. 3 is a detailed view of centrifugal compressor 14 at the end of housing 30 having a sealed opening. As can be seen in the detailed view, labyrinth seal 28 is urged against rotating shaft 22 by a spring-like combination comprising a flexible washer 40, which bears against the back of labyrinth seal 28 to maintain seal 28 against shaft 22 as shaft 22 rotates. Flexible washer 40 is maintained in position by a washer support 42, which is maintained in position by bolts 44.

Figure 4:
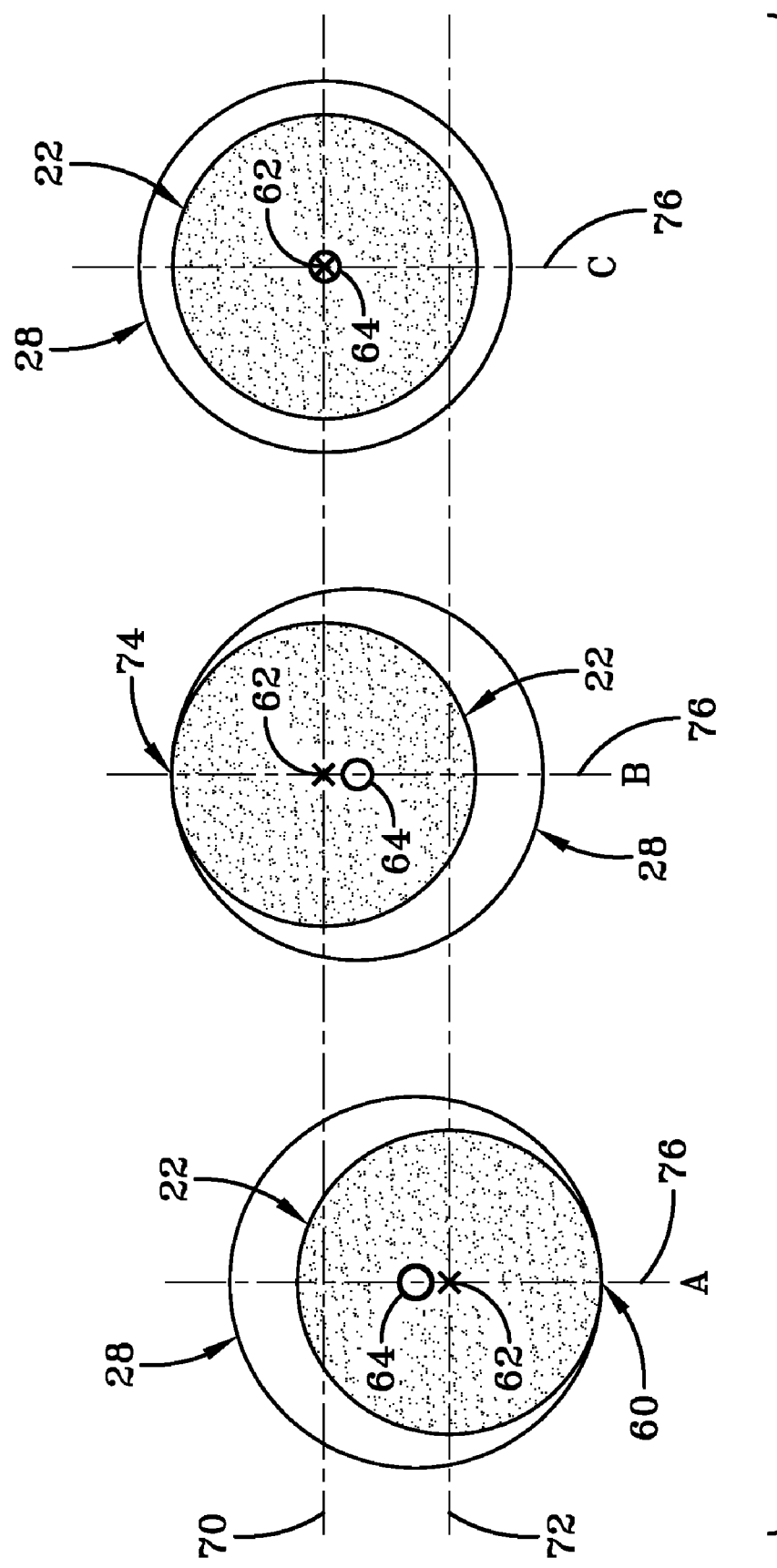
FIG. 4 is a cross sectional view of the relative positions of the shaft and a labyrinth seal in various situations, FIG. 4A depicting the position of a labyrinth seal with respect to the shaft after loss of power to electromagnetic bearings, FIG. 4B depicting the position of a labyrinth seal at one intermediate position during centering procedures, and FIG. 4C depicting the labyrinth seal centered with respect to the shaft after completion of centering procedures.

Rotating shaft 22 and seal 28 of a turbomachine, such as a compressor, for example, a centrifugal compressor 14, used in an air conditioning or refrigeration application, utilizes electromagnetic bearings 20 to center shaft 22. However, shaft 22 is no longer centered when power is removed either intentionally or unintentionally from centrifugal compressor 14. FIG. 4A depicts the position of the shaft and the seal when power is removed from electromagnetic bearings 20. Centrifugal compressor 14 includes safety mechanical back-up bearings 46, usually rolling element bearings, that extend around shaft 22 for 360 degrees in a conventional manner to permit the turbomachinery to coast safely to a stop when power is lost to electromagnetic bearings 20. Seal 28, shaft 22 and the rolling element bearings have arcs that intersect at lower point of contact 60 when power is lost and compressor 14 is stopped, illustrated in FIG. 4A. In this position, a center 62 of shaft 22 is no longer concentric with a center 64 of seal 28, the centers now being offset by the clearance between shaft 22 and bearing 28, the shaft center 62 being located on a line 72, a fixed reference line in FIG. 4. FIG. 4B shows the position of the shaft and of the seal when the shaft is normally levitated by the electromagnetic bearings, without implementing the procedure outlined herein. When power is restored, shaft 22 is moved by the electromagnetic field of the bearings so that shaft center 62 moves to the position on line 70, which is also a fixed reference line for the purposes of FIG. 4, lying above reference line 72. Movement of shaft 22 by the electromagnetic bearings 20 also results in movement of labyrinth seal 28, however seal center 64 and shaft center 62 are not concentric along line 70, shaft center 62 being positioned above seal center 64, seal 28 and shaft 22 intersecting at the upper point of contact 74. In this situation, which occurs when power is restored to electromagnetic bearings 20, shaft center 62 and the seal center 64 are not concentric, as is clear in FIG. 4B. As shaft 22 rotates, wear will occur along the intersecting arcs close to contact point 74, which is undesirable. Shaft center 62 and seal center 64 should be concentric as depicted in FIG. 4C to avoid unnecessary wear.

Of course, after power is restored, it is preferred not to run turbomachinery, such as compressor 14 with shaft 22 and seal 28 in the position depicted in FIG. 4B. FIG. 4C represents the position of shaft 22 and seal 28 after manipulating shaft 22 using the process set forth herein, which restores proper clearances between shaft 22 and seal 28 so that shaft center 62 and seal center 64 are concentric.

Figure 5:
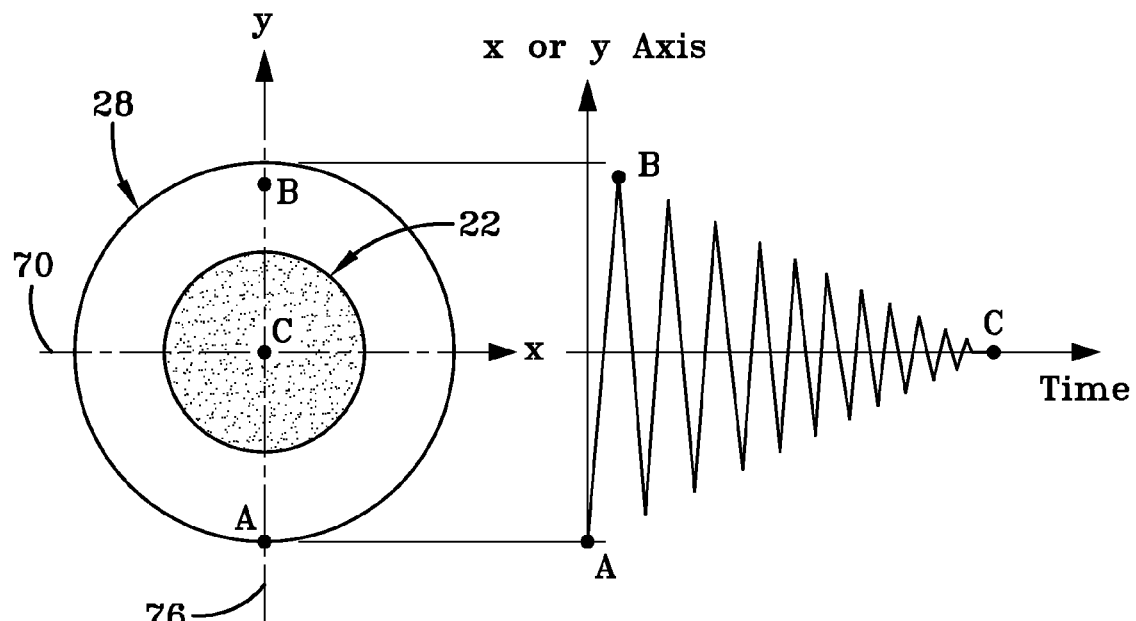
FIG. 5 depicts a sequence of movements of the shaft along one preselected radial axis using decreasing amplitudes by applying power to the electromagnetic bearings so that the shaft and seal become concentric, while providing substantially uniform clearance around the shaft.

Referring again to FIG. 4B, shaft 22 is first levitated, using electromagnetic bearings 20, as occurs when power is restored, to a position in which shaft center 62 is shifted to a position on upper reference line 70. This is simply a translation of shaft center 62 along a vertical reference line 76 to the normal operation center position for shaft 22. However, it will be understood by those skilled in the art that the vertical line depicted in FIG. 4B may not initially correspond to the original center position of shaft 22, but may be offset to the left or right of the original center position along upper reference line 70, as will become evident. It will also be evident that the initial movement of shaft 22 may be preselected to be along any straight line, as movement of shaft 22 can be manipulated by the current applied to electromagnetic bearings 20. It is preferred that shaft 22 be manipulated to pass in a straight line through the original center position, which is located at the intersection of reference lines 70 and 76 in FIG. 4. Shaft 22 may be brought into contact with labyrinth seal 28 at this center position or shaft 22 may move slightly beyond its original center point, here in a vertical direction as indicated in FIG. 5. Shaft 22 continues to move along this line to a first preselected position, indicated by point B in FIG. 5, which moves seal center 64 further in this direction as well, providing the required clearance of seal 28 and shaft 22 in this direction. The shaft center is then returned to a position intersecting line 70, preferably back to its original center position indicated by point C in FIG. 5, leaving clearance between the shaft and seal in this direction. Shaft 22 is next moved along the same axis, but in an opposite direction and by a decreasing distance. The process is repeated, with each movement resulting in movement of shaft 22 in decreasing distances, as indicated by the decreasing amplitudes representative of distances in FIG. 5. In FIG. 5, the sequence of movement is depicted along the vertical axis only, which ensures that seal 28 is properly centered with the normal running position of shaft 22 along the vertical axis. After this sequence has been implemented along the vertical axis, it can be repeated along the horizontal axis, to properly center shaft 22 along the horizontal axis. Also, the sequences can be run together, so that both the vertical alignment and horizontal alignment are accomplished in a series of moves of decreasing distance, and not as separate operations, if desired. Furthermore, the sequences are not restricted to only vertical and horizontal axes, as any set of axes may be chosen, or to just two axes, although it is preferred that if only two axes are selected, that they be orthogonally positioned.

The movement of shaft 22 is accomplished by varying the current applied to the electromagnetic bearings 20. The shaft center position is defined by coordinate values that can be stored in a controller, and the position of shaft 22 is monitored by position sensors, which are already present as previously discussed. A desired trajectory of the center of shaft 22 can be programmed into the magnetic bearing controller. The controller will compare the actual position of the shaft, known by position sensors, with the desired position as programmed, then sent the adequate current to the electromagnetic bearings 28, in order to move shaft 22 as required. A variety of programs can be implemented into the controller, depending on the desired result. The desired position of the shaft usually is one in which the shaft axis is coaxial with that of the electromagnetic bearings in their normal operating position, which is a fixed, known position.

As indicated, shaft 22 is moved along position line 70 in a direction 90 degrees to the prior movement of shaft 22, through the original center point of the shaft to a second preselected position. Since the prior movement of shaft 22 described above was in a vertical direction, this movement of shaft 22 is in a horizontal direction. If seal 28 was not centered, the movement of shaft 22 will result in contact with seal 28 and shift seal 28 as shaft 22 moves. The second preselected position is selected to place seal 28 in its original position with clearance between 28 seal and shaft 22, so that seal center and shaft center 62 are substantially concentric. When shaft 22 is then levitated, it will be substantially restored to the position indicted in FIG. 4C, placing shaft center 62 substantially concentric with seal center 64. This procedure restores shaft 22 and seal 28 to respective positions wherein there is adequate clearance between shaft 22 and seal 28 during operation of turbomachinery such as compressor 14 during normal operation of electromagnetic bearings 20.

A more exact positioning of seal center 64 and shaft center 62 can be accomplished by first using the "cross motion" procedure described previously by using the decreasing amplitude procedure as depicted in FIG. 5. As previously noted, the procedure can then be repeated several times along different pairs of axes, (preferably each pair being orthogonal to one another), with decreasing amplitudes for successive positions. This will allow for virtually perfect centering of the shaft and seal, even if the clearance is not known precisely.

The procedures described herein permit acceptable seal centering even when the seal clearance is not known precisely, such as due to manufacturing tolerances and wear. The procedures allow for the use of seals 28 that can reduce the clearance between seals 28 and shafts 22 since the centering procedure equalizes the clearance between seals 28 and shaft 22 circumferentially around shaft 22. When compressor 14 is stopped, the seal clearance and the bearing clearance can be monitored. Using the "cross" motion technique, the incremental force required to move the shaft when it begins to entrain the seal can be measured by monitoring the current (amperes) required by electromagnetic bearings 20, providing an indication of the wear between seals 28 and shaft 22. The programming instructions required to manipulate the locations of seals 28 are readily included in the bearing control system which may be run by the controller. Interim seal clearance maintenance can be effected even between routine maintenance intervals, allowing for "smart" conditional maintenance.

In one embodiment and for purposes of illustration only, the shaft may be mounted horizontally, but is not so limited. In this orientation, after power is removed from the electromagnetic bearings, the shaft of the turbomachinery is drawn downward by force of gravity. The shaft shifts from a first rotating position, to a second rest position in which the shaft contacts the back-up bearings, provided as a safety feature. As it is being drawn downward to the rest position, the shaft first contacts the seal, which is also moved downward, also moving the center of the seal with respect to the center of the shaft, until the shaft and seal come to rest when the shaft comes in contact with the back-up mechanical bearings. Both the shaft and the seal are now in the second, lower, rest position. Prior to reactivation of the rotation of the turbomachinery, the electromagnetic bearings are powered in a predetermined sequence to center the shaft with respect to the seal.

The power is applied to the windings of the electromagnetic bearings to move the shaft center along a first preselected radial axis. Usually this axis is through the center of the shaft when it is at rest, to the normal, centered position. For a horizontally-oriented shaft, this radial axis is usually a vertical axis and the initial motion is upward along the vertical axis to the centered position, and then beyond the centered position, that is to say, overshooting the centered position, to a position located about one half the diametral clearance between the shaft and the seal above the centered position, without contacting the mechanical safety bearings. Thus, motion results in the shaft contacting the seal and moving it to a new position. Power to the electromagnetic bearings is then altered to move the shaft back to its centered position. This movement aligns the first preselected radial axis, as noted, the vertical axis of the shaft with respect to the seal. The position of the shaft is monitored by position sensors. The above methods assume that seal clearance is known. Actually, seal clearance is not known precisely due to a number of factors, including manufacturing tolerances and wear which may have occurred. To overcome this uncertainty, positioning of the seal can be further improved. Instead of overshooting by the (unknown) radial clearance along the first preselected axis, the overshoot should initially be by a distance larger than the theoretical seal clearance, but smaller than the mechanical bearing clearance. The shaft can then be moved back and forth along this radial axis in an oscillating or reciprocating motion of decaying amplitude about the geometric center of the axis. In this way, the shaft will move the seal back and forth while the amplitude of the motion is larger than the seal clearance. Continued oscillation or reciprocation of the shaft across the geometric center with smaller and smaller amplitudes will eventually result in motions that are less than the seal clearance, and the shaft will not touch the seal during these motions. As a result, the seal will be perfectly centered about the first preselected radial axis.

At this step in the procedure, the seal is now substantially perfectly centered about the first predetermined radial axis, but not necessarily about the geometric center of the bearings. To achieve the centering of the seal about this center, a second radial axis perpendicular to the first axis is selected, while maintaining the shaft centered along the first axis. The steps of decaying, oscillating or reciprocating motion as described above are now repeated along the second axis. Alternatively, the shaft center may be moved with a decreasing distance from the axis of the electromagnetic bearings, so that the movement of the shaft center is a decaying spiral that results in the shaft center being positioned on the axis of the electromagnetic bearings, and the shaft longitudinal axis being coaxial with the longitudinal axis of the electromagnetic bearings. The oscillating or reciprocating motion of the shaft in decreasing amplitudes is readily controlled by a properly programmed controller that controls application of power to the windings of the electromagnetic bearings.

When the shaft is moved as described above prior to restart of the turbomachinery, the shaft and seal can be positioned out of contact with each other and the turbomachinery can restart rotation in normal operation with a small gap between the shaft and the seal, so there is no seal contact. By returning the seal and the shaft to a position in which they are out of contact, the problem with residual contact between the shaft and seal and the wear associated with it is eliminated. By repeating the process with decaying amplitude, any variations of the shaft with respect to the seal, either due to variations in manufacturing tolerances or eccentric motion of the shaft during coast-down following loss of power can be corrected.

Figure 6:
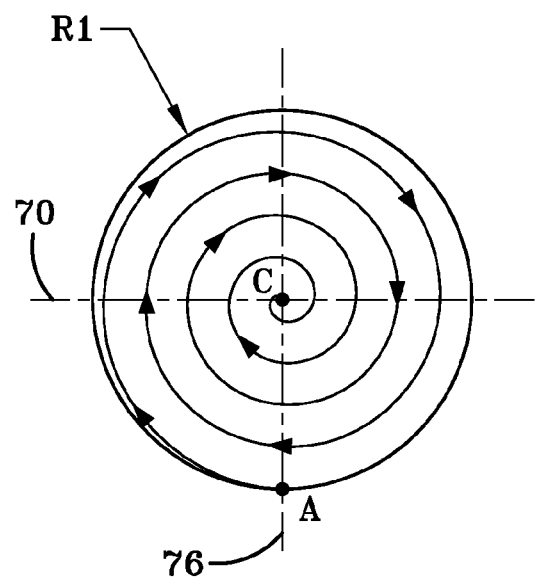
FIG. 6 depicts an alternate sequence of movements of the shaft in a decreasing spiral to achieve shaft and seal concentricity.

In yet another embodiment, centering of shaft 22 and seal 28 is achieved by moving shaft 22 and its center 62 in a decaying spiral, that is, a spiral of constantly decreasing radius r as depicted in FIG. 6, where the initial radius $r_1$ is the distance from the axis substantially centered within electromagnetic bearings 20, represented by point C, and shaft center 62 when bearings 12 are unpowered, represented by point A. This is distinguished from the above-described method, which moves the shaft along individual radial axes with decreasing amplitude or distance along the axes. In this embodiment, the first preselected position may be selected to provide maximum possible clearance between seal 28 and shaft 22, while the final position places shaft center 62 and seal center 64 so that they are concentric along an axis substantially centered within electromagnetic bearings 20. The power to the windings is smoothly and continuously adjusted to move shaft 22 and shaft center 62 from the initial radius to a radius that approaches zero. When the radius approaches zero, shaft center 62 and seal center 64 should be substantially concentric along an axis centered between the electromagnetic bearings, as determined by position indicator apparatus. The decaying spiral can be approximated as closely as desired by proper programming of a controller that controls the electromagnetic bearings.

It is important to note that the construction and arrangement of the shaft and seal as shown in the various exemplary embodiments is illustrative only. It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products that accomplish the required movements of the shaft on any machine-readable media for accomplishing its operations. The embodiments of the present application may be implemented using existing computer processors or controllers, or by a special purpose computer processor for an appropriate system, incorporated for this or another purpose or by a hardwired system.

Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

What is claimed is:

1. A method of centering a shaft and positioning an associated seal movable in a radial direction in turbomachinery utilizing electromagnetic bearings controlled by a controller, comprising the steps of:
    applying power to the electromagnetic bearings with the controller that controls motion of the shaft,
    wherein the electromagnetic bearings include windings;
    moving the shaft into contact with the seal by application of power to the bearings with the controller and moving the shaft in a radial direction, thereby moving the seal to a radial position, whereby the radial position avoids contact between the shaft and seal when the shaft is in its centered position and rotating; and wherein the steps of applying power to the electromagnetic bearings includes applying power to the winding of the electromagnetic bearings.

2. The method of claim 1 further including an additional step of moving the shaft out of contact with the seal and centering the shaft so that a shaft axis is substantially coaxial with an axis of the electronic bearings prior to initiating rotation of the shaft.

3. The method of claim 2 wherein the turbomachinery further includes position indicating apparatus, and the position indicating apparatus determine the coaxiality of the shaft axis and the bearings axis prior to initiation of shaft rotation.

4. The method of claim 1 wherein the turbomachinery further includes logic within the controller that applies power to the electromagnetic bearings, the logic controlling movement of a shaft center along a predetermined trajectory that contacts the shaft to the seal, thereby moving the seal, the predetermined trajectory placing the seal in a predetermined location.

5. The method of claim 1 wherein the turbomachinery utilizing the electromagnetic bearings is a centrifugal compressor.

6. The method of claim 1 wherein the shaft is in contact with the seal and further in contact with a mechanical bearing immediately prior to applying electrical power to the electromagnetic bearings.

7. The method of claim 2 further including a step of determining an initial radius between a shaft center initial position, wherein the shaft is in contact with the seal and a shaft center final position, wherein the shaft is out of contact with the seal.

8. The method of claim 2 wherein the step of centering the shaft includes moving the shaft in a circular motion from the initial position with a constantly decreasing radius to a final position.

9. the method of claim 8 wherein the shaft final position lies along the axis of the electromagnetic bearings in their normal operating position so that the shaft axis is substantially coaxial with the axis of the electromagnetic bearings.

10. The method of claim 1 further including a step of applying power to the electromagnetic bearings and moving the shaft to a first preselected position that provides maximum clearance between the seal and the shaft.

11. The method of claim 10 wherein the first preselected position of the shaft is in a centered position and wherein a shaft axis is substantially coaxial with an axis of the electromagnetic bearings.

12. The method of claim 2 wherein when shaft rotation is initiated, there is no contact between the shaft and seal.

13. The method of claim 12 wherein when the shaft axis is substantially coaxial with the axis of the electromagnetic bearings and out of contact with the seal, a radial clearance exists 360 degrees around a circumference of the shaft between the shaft and the seal.

\* \* \* \* \*